US011436140B2

(12) United States Patent
Na

(10) Patent No.: US 11,436,140 B2
(45) Date of Patent: *Sep. 6, 2022

(54) MEMORY CONTROL SYSTEM FOR SETTING GARBAGE COLLECTION FREQUENCY HIGHER IN DIRTY MODE

(71) Applicant: SK hynix Inc., Gyeonggi-do (KR)

(72) Inventor: Hyeong Ju Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,509

(22) Filed: Aug. 24, 2020

(65) Prior Publication Data

US 2021/0240613 A1 Aug. 5, 2021

(30) Foreign Application Priority Data

Feb. 5, 2020 (KR) .......................... 10-2020-0013747

(51) Int. Cl.
*G06F 12/02* (2006.01)
(52) U.S. Cl.
CPC .. *G06F 12/0253* (2013.01); *G06F 2212/1044* (2013.01)
(58) Field of Classification Search
None
See application file for complete search history.

(56) References Cited

U.S. PATENT DOCUMENTS

| 10,929,289 | B2* | 2/2021 | Na | G06F 12/0253 |
| 2014/0032817 | A1* | 1/2014 | Bux | G06F 12/0261 |
| | | | | 711/103 |
| 2017/0242789 | A1* | 8/2017 | Ahmed | G06F 12/0246 |
| 2017/0285945 | A1* | 10/2017 | Kryvaltsevich | G06F 3/0659 |
| 2019/0121728 | A1* | 4/2019 | Jung | G06F 12/0261 |

FOREIGN PATENT DOCUMENTS

| KR | 10-2016-0078611 | 7/2016 |
| KR | 10-2018-0089742 | 8/2018 |

\* cited by examiner

*Primary Examiner* — Jared I Rutz
*Assistant Examiner* — Marwan Ayash
(74) *Attorney, Agent, or Firm* — IP & T Group LLP

(57) ABSTRACT

A memory system may include a memory device including a plurality of memory blocks and a controller suitable for determining whether to change from a normal mode to a dirty mode based on a size of free space of a host a sum of an amount of restoration of garbage collection for victim blocks and a size of all free blocks in the memory device. In the dirty mode, the controller controls the memory device to perform a garbage collection operation on the victim blocks at a frequency greater than frequency at which a garbage collection operation is performed in the normal mode.

18 Claims, 7 Drawing Sheets

FIG. 5

| GROUP i | GROUP 1 | GROUP 2 | ... | GROUP 9 | GROUP 10 | |
|---|---|---|---|---|---|---|
| RATIO_VP | 0 ~ 10% | 10 ~ 20% | ... | 80 ~ 90% | 90 ~ 100% | ~502 |
| BLK | $BLK_{11}$<br>$BLK_{12}$<br>$BLK_{13}$<br>⋮<br>$BLK_{1j1}$ | $BLK_{21}$<br>$BLK_{22}$<br>$BLK_{23}$<br>⋮<br>$BLK_{2j2}$ | ... | $BLK_{91}$<br>$BLK_{92}$<br>$BLK_{93}$<br>⋮<br>$BLK_{9j9}$ | $BLK_{101}$<br>$BLK_{102}$<br>$BLK_{103}$<br>⋮<br>$BLK_{10j10}$ | |
| ΣVPC | $N_1$ | $N_2$ | ... | $N_9$ | $N_{10}$ | |

MEMORY CONTROL SYSTEM FOR SETTING GARBAGE COLLECTION FREQUENCY HIGHER IN DIRTY MODE

CROSS-REFERENCE TO RELATED APPLICATION

This application claims priority under 35 U.S.C. § 119 to Korean Patent Application No. 10-2020-0013747, filed on Feb. 5, 2020, which is incorporated herein by reference in its entirety.

BACKGROUND

1. Field

Embodiments relate to a memory system, and more particularly, to a memory system for changing frequency of the execution of a garbage collection operation based on the amount of restoration of garbage collection and an operating method thereof.

2. Discussion of the Related Art

Recently, a paradigm for the computer environment has shifted to ubiquitous computing in which computer systems can be used anywhere, at any time. Accordingly, the use of portable electronic devices, such as mobile phones, digital cameras and laptop computers, has increased rapidly. In general, such a portable electronic device uses a memory system using a memory device, in other words, a data storage device. The data storage device is used as a primary memory device or auxiliary memory device of the portable electronic device.

A data storage device using a memory device has excellent stability and durability because it does not include a mechanical driver. Furthermore, the data storage device has advantages in that access speed for information is fast and power consumption is low. As an example of a memory system having such advantages, the data storage device includes a universal serial bus (USB) memory device, a memory card having various interfaces, and a solid state drive (SSD).

SUMMARY

Various embodiments are directed to a memory system capable of increasing the frequency of execution of a garbage collection operation when the sum of the amount of restoration of garbage collection, that is, the size of a space to be restored by a garbage collection operation performed until valid data is programmed into all free blocks in a memory device and the size of free blocks is less than the free space of a host, that is, the space of the memory device recognized by the host.

In an embodiment, a memory system may include a memory device including a plurality of memory blocks and a controller suitable for determining whether to change from a normal mode to a dirty mode based on a size of free space of a host and a sum of the amount of restoration of garbage collection for victim blocks and the size of all free blocks in the memory device. In the dirty mode, the controller controls the memory device to perform a garbage collection operation on the victim blocks at a frequency greater than the frequency at which a garbage collection operation is performed in the normal mode.

In an embodiment, an operating method of a memory system may include determining whether to change from a normal mode to a dirty mode based on a size of free space of a host and a sum of an amount of restoration of garbage collection for victim blocks and a size of all free blocks in a memory device and performing, in the dirty mode, a garbage collection operation on the victim blocks at a frequency greater than the frequency at a garbage collection operation is performed in the normal mode.

In an embodiment, a memory system includes a memory device including a plurality of memory blocks; and a controller, coupled to the memory device, suitable for: performing a normal garbage collection operation in a normal mode at a first rate; determining whether to change from the normal mode to a dirty mode based on the number of valid pages, the number of free blocks and a restoration amount associated with the normal garbage collection operation; and performing, in the dirty mode, a dirty garbage collection operation at a second rate greater than the first rate.

BRIEF DESCRIPTION OF THE DRAWINGS

FIG. 5 illustrates memory blocks classified into a plurality of groups.

DETAILED DESCRIPTION

Figure 1:
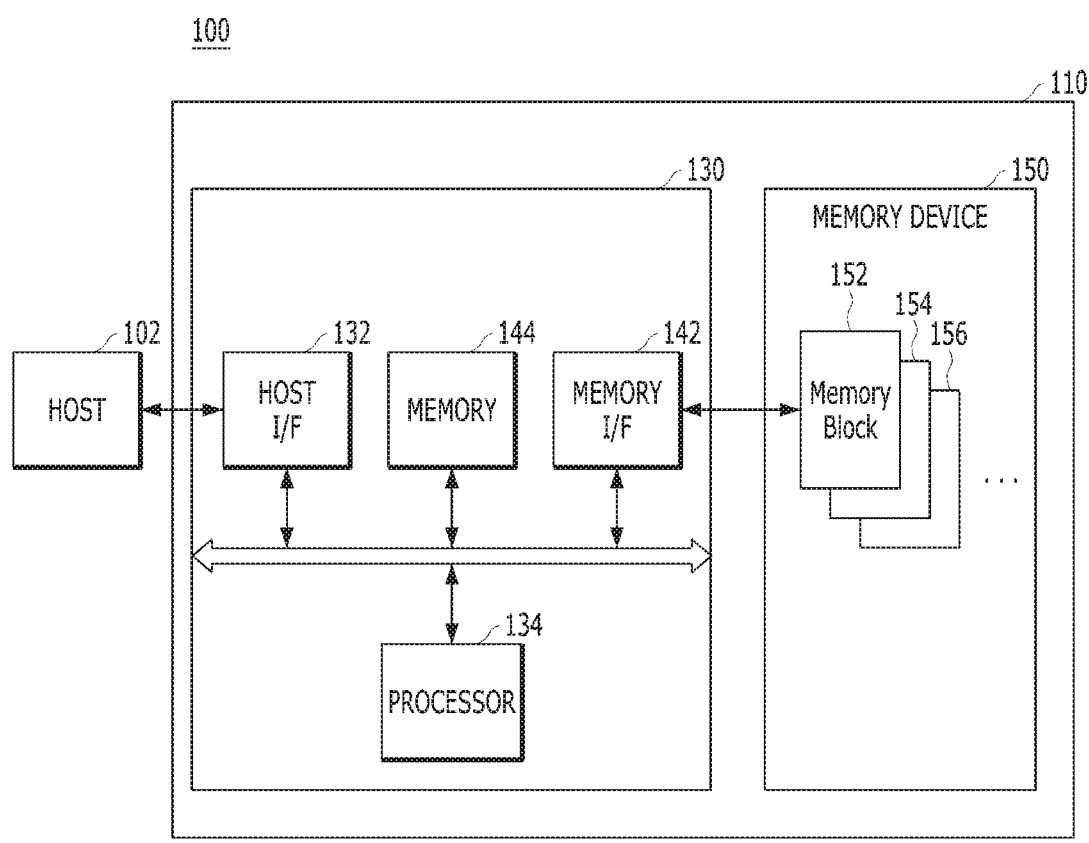
FIG. 1 is a diagram schematically illustrating a data processing system including a memory system according to an embodiment of the disclosure.

Various embodiments are described below in more detail with reference to the accompanying drawings. The present disclosure may, however, be embodied in different forms and thus should not be construed as limited to the embodiments set forth herein. Rather, these embodiments are provided so that this disclosure is thorough and complete, and fully conveys the scope of the present invention to those skilled in the art. Throughout the disclosure, like reference numerals refer to like parts throughout the various figures and embodiments of the present disclosure. Throughout the specification, reference to "an embodiment," "another embodiment" or the like is not necessarily to only one embodiment, and different references to any such phrase are not necessarily to the same embodiment(s).

FIG. 1 is a diagram schematically illustrating a data processing system 100 including a memory system according to an embodiment of the disclosure.

Referring to FIG. 1, the data processing system 100 includes a host 102 and a memory system 110.

Furthermore, the host 102 includes any of various electronic devices, for example, any of a variety of portable electronic devices, such as a mobile phone, an MP3 player and a laptop computer, or any of larger electronic devices, such as a desktop computer, a game machine, television (TV) and a projector. That is, the host 102 may be a wired or wireless electronic device.

Furthermore, the host 102 may include at least one operating system (OS) or a plurality of OSs. Furthermore, the host 102 executes an OS to perform an operation corresponding to a user request along with the memory system 110. In this case, the host 102 transmits, to the memory system 110, a plurality of commands corresponding to the user request. In response thereto, the memory system 110 performs operations corresponding to the commands, that is, operations corresponding to the user request. The OS generally manages and controls the functions and operations of the host 102, and provides interaction between the data processing system 100 or a user who uses the memory system 110 and the host 102.

Furthermore, the memory system 110 operates in response to a request from the host 102, and particularly, stores data accessed by the host 102. In other words, the memory system 110 may be used as a primary memory device or auxiliary memory device of the host 102. In this case, the memory system 110 may be implemented as any of various types of storage devices (e.g., solid state drive (SSD), MMC and embedded MMC (eMMC)) depending on a host interface protocol for communication with the host 102.

Furthermore, the storage device that implement the memory system 110 may be implemented using any of various volatile memory devices, such as a dynamic random access memory (DRAM) or a static RAM (SRAM), or any of various non-volatile memory devices, such as a read only memory (ROM), a mask ROM (MROM), a programmable ROM (PROM), an erasable programmable ROM (EPROM), an electrically erasable and programmable ROM (EEPROM), a ferroelectric RAM (FRAM), a phase change RAM (PRAM), a magnetic RAM (MRAM), a resistive RAM (RRAM), or a flash memory.

The memory system 110 includes a memory device 150 and a controller 130.

In this case, the controller 130 and the memory device 150 may be integrated into a single semiconductor device. For example, the controller 130 and the memory device 150 may be integrated into a single semiconductor device, and may be configured as an SSD, a PC card (e.g., personal computer memory card international association (PCMCIA)), a secure digital (SD) card (e.g., miniSD, microSD, SDHC), or a universal flash storage (UFS). For another example, the memory system 110 may be an element in any of various computing systems, e.g., computer, smartphone or portable game machine.

The memory device 150 of the memory system 110 can retain data stored therein although power is not supplied thereto. Particularly, the memory device 150 stores data provided by the host 102 through a write operation, and provides stored data to the host 102 through a read operation. In this case, the memory device 150 includes a plurality of memory blocks 152, 154, 156, each of which includes a plurality of pages. Furthermore, each of the pages includes a plurality of memory cells to which a plurality of word lines (WL) is coupled. Furthermore, each of the plurality of memory blocks 152 to 156 may include a plurality of planes. Particularly, the memory device 150 may include a plurality of multi-plane memory dies. Furthermore, the memory device 150 may be a non-volatile memory device, for example, a flash memory. In this case, the flash memory may have a three-dimensional stack structure.

Furthermore, the controller 130 controls the memory device 150 in response to a request from the host 102. For example, the controller 130 provides the host 102 with data read from the memory device 150, and stores data, provided by the host 102, in the memory device 150. To this end, the controller 130 controls an operation of the memory device 150, such as read, write, program or erase.

More specifically, the controller 130 includes a host interface (I/F) 132, a processor 134, a memory I/F 142 and a memory 144.

Furthermore, the host I/F 132 may be configured to process a command and data of the host 102 and to communicate with the host 102 through at least one of various interface protocols, such as a universal serial bus (USB), serial advanced technology attachment (SATA), a small computer system interface (SCSI) and an enhanced small disk interface (ESDI). In this case, the host I/F 132 may be driven through firmware called a host interface layer (HIL), that is, a region in which data is exchanged between the HIL and the host 102.

Furthermore, the memory I/F 142 serves as a memory/storage interface for performing interfacing between the controller 130 and the memory device 150 to enable the controller 130 to control the memory device 150 in response to a request from the host 102.

Furthermore, the memory 144 is an operating memory of the memory system 110 and the controller 130, and stores data for the driving of the memory system 110 and the controller 130.

In this case, the memory 144 may be implemented as a volatile memory. For example, the memory 144 may be implemented as a static random access memory (SRAM) or a dynamic random access memory (DRAM). Furthermore, the memory 144 may be within or externally to the controller 130. In an embodiment, the memory 144 may be implemented as an external volatile memory to exchange data with the controller 130 through the memory I/F 142.

The memory 144 stores data to perform an operation, such as data write or read, between the host 102 and the memory device 150 and data when an operation, such as data write or read, is performed. For such data storage, the memory 144 may function as a program memory, a data memory, a write buffer/cache, a read buffer/cache, a data buffer/cache, and/or a map buffer/cache.

The processor 134 controls overall operation of the memory system 110. Particularly, the processor 134 controls a program operation or read operation for the memory device 150 in response to a write request or read request from the host 102. In this case, to control overall operation of the memory system 110, the processor 134 drives firmware called a flash translation layer (FTL). Furthermore, the processor 134 may be implemented as a microprocessor or a central processing unit (CPU).

The controller 130 receives a request from the host 102 and performs the associated operation on the memory device 150 through the processor 134. In other words, the controller 130 performs a command operation, corresponding to a command received from the host 102, in cooperation with the memory device 150. Furthermore, the controller 130 may perform a background operation on the memory device 150. In this case, the background operation for the memory device 150 includes a garbage collection (GC) operation, a wear leveling (WL) operation, a map flush operation, and/or a bad block management operation.

A flash memory performs a program operation and a read operation in a page unit, performs an erase operation in a block unit, and is characterized in that it does not support an overwrite operation unlike a hard disk. Accordingly, in order to modify the original data programmed into a page, the flash memory programs modified data into a new page and invalidates the page of the original data.

A garbage collection operation refers to an operation of periodically changing an invalidated page to an empty page in order to more efficiently use memory space. The garbage collection operation includes an operation of copying the valid data of a victim block into one or more empty pages of a target block and an operation of erasing the victim block. When a garbage collection operation is performed, a memory space corresponding to the size of invalid data stored in a victim block can be restored. In this case, the garbage collection operation corresponds to a background operation autonomously performed by a memory system in the absence of a request from a host. While the garbage collection operation is performed, performance of a foreground operation performed in response to a request from the host may be degraded.

A controller may control a memory device to perform a garbage collection operation whenever an amount of user data corresponding to a first threshold is programmed into the memory device. The frequency of execution of the garbage collection operation may be changed by changing the first threshold. The user data may be data programmed in response to a request from a host. The frequency of execution of a garbage collection operation may be determined as the number of times a garbage collection operation is performed when the same amount of user data is programmed into the memory device. The amount of user data may determine a period of time. If the remaining space of the memory device is insufficient, the controller may increase the frequency of execution of a garbage collection operation by decreasing the first threshold. As frequency of the execution of a garbage collection operation is increased, more remaining space can be rapidly secured for a short time.

A controller may change the frequency of execution of a garbage collection operation by changing its operation mode from a normal mode to a dirty mode or vice versa. The frequency of execution of a first garbage collection operation in the normal mode may be less than the frequency of execution of a second garbage collection operation in the dirty mode. Initially, i.e., right after fabrication, a flash memory may be set in the normal mode. The controller may periodically perform a garbage collection operation in the normal mode at the frequency associated with the normal mode. When the remaining space of the memory device is insufficient, the controller may enter the dirty mode to increase the frequency at which a garbage collection operation is performed, since the frequency of execution of the second garbage collection operation is higher than that of the first garbage collection in the normal mode.

Generally, a controller determines whether the remaining space of a memory device is insufficient based on the number of free blocks. A free block may be an empty block in the memory device. For example, when the number of free blocks is less than or equal to a second threshold, the controller may increase the frequency of execution of a garbage collection operation by entering a dirty mode. If, as a result of the increased frequency of execution of a garbage collection operation, the number of free blocks is increased to greater than the second threshold, the controller may decrease the frequency of execution of a garbage collection operation by entering a normal mode again.

However, determining whether to enter a normal mode or a dirty mode based on the number of free blocks, may cause the frequency of execution of a garbage collection operation itself to be frequently changed. For example, the size of valid data stored in a single level cell (SLC) memory block may be smaller than the size of valid data stored in a multi-level cell (MLC) memory block because the SLC memory block is physically the same memory block as the MLC memory block, but uses only half the capacity of the MLC memory block. Accordingly, the controller may more rapidly complete a garbage collection operation on a SLC memory block than on an MLC memory block because the size of valid data moved according to the garbage collection operation is smaller in the SLC memory block than in the MLC memory block. Accordingly, free SLC blocks can be rapidly generated by performing a garbage collection operation on SLC memory blocks, which operation can be repeated when the number of free blocks falls below a threshold. If the number of free blocks rapidly increases to reach a second threshold as a result of performing the garbage collection operation on SLC memory blocks after entering the dirty mode, the controller may decrease the frequency of execution of a garbage collection operation by entering the normal mode again.

Thereafter, when a program request is provided by a host, the controller may program user data into free block(s). If the free block supply is exhausted in response to a program request, the controller may enter the dirty mode again. If a garbage collection operation is performed on an SLC memory block, the controller may alternately enter the dirty mode and the normal mode more frequently. As a result, the frequency of execution of a garbage collection operation may be frequently changed. As described above, whether to perform a garbage collection operation may affect performance of the host. If the frequency of execution of a garbage collection operation is frequently changed, performance of the host may also frequently vary. From a user's perspective frequent performance variation of the host is undesirable; thus, frequently changing the frequency of execution of a garbage collection operation may be an issue. If a garbage collection operation must be performed due to insufficient space in a memory system, and thus host performance degradation is inevitable, a user may prefer that such degradation is regular in terms of when it occurs and for how long; that is, if host performance degradation must occur, from the user's perspective it is better that such degradation occur at a regular interval and for the same period of time.

Furthermore, when it is determined whether to enter the normal mode or the dirty mode based on a free block, if garbage collection operations are performed on memory blocks having different ratios of valid pages, the times during which the controller operates in dirty mode are not uniform. If a garbage collection operation is performed on an SLC memory block, a free block can be rapidly secured compared to a case where a garbage collection operation is performed on an MLC memory block. Accordingly, if a garbage collection operation is performed on an SLC memory block, the time during which the dirty mode is maintained may be short. In contrast, if a garbage collection operation is performed on an MLC memory block, the time during which the dirty mode is maintained may be long. To the extent that host performance degradation is inevitable, it is better from a user's perspective that the time during which such degradation occurs be regular. Thus, it is preferable that each time period during which the dirty mode is maintained is constant. If the periods of time during which the dirty mode are irregular, a user does not have any expectation as to the that host performance will be low.

Figure 2:
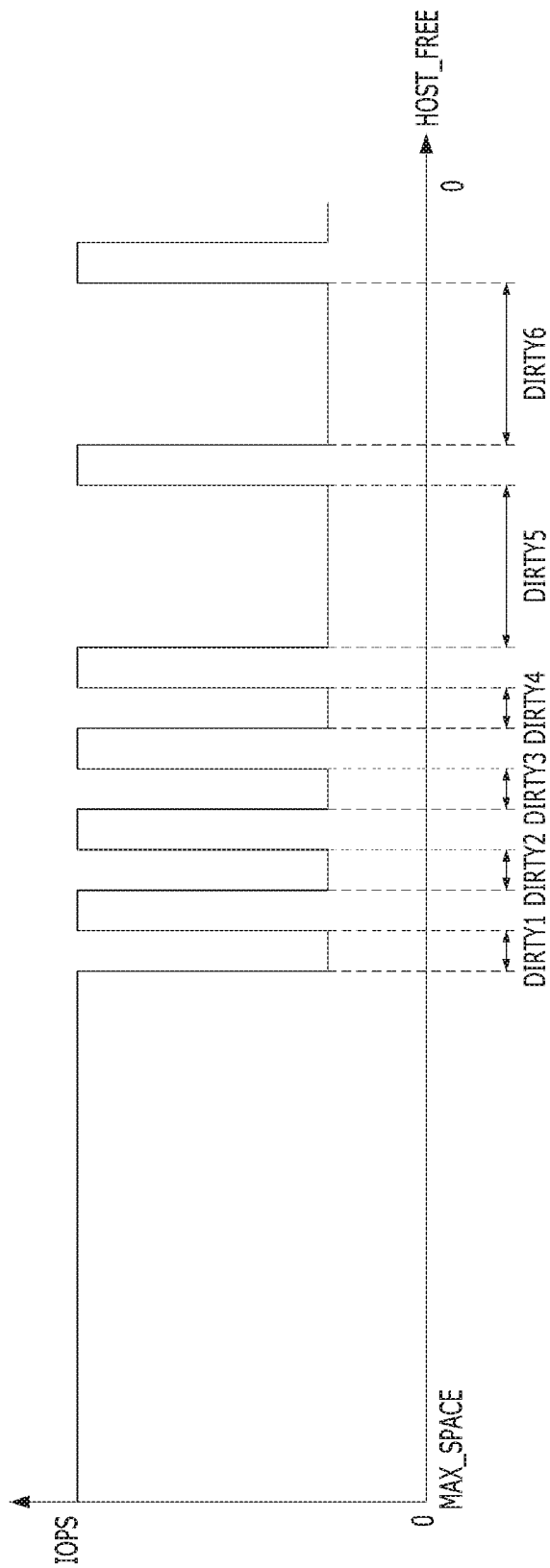
FIG. 2 illustrates performance of a host according to conventional garbage collection technology.

FIG. 2 illustrates performance of a host according to a conventional garbage collection operation.

The graph illustrated in FIG. 2, the x axis indicates free space of host (HOST_FREE) and the y axis indicates input/output operations per second (IOPS) performed during a unit time. The TOPS may be an index indicative of performance of the host.

The free space of host (HOST_FREE) may be the remaining (free) space of a memory device recognized by the host. Specifically, the free space of host (HOST_FREE) may be a difference between an initial capacity of the memory device right after fabrication of the memory system of which the memory device is a part and the storage capacity of valid pages in the memory device. The initial capacity of the memory device may be the remaining capacity of the memory device recognized by the host right after fabrication, and may be determined based on specifications. An initial capacity (e.g., a first capacity) of a memory device may be different from an actual capacity (e.g., a second capacity) of the memory device right after fabrication of the memory system. Specifically, the first capacity may be the second capacity less a capacity of an overprovision region. The memory system secures an over-provision region not recognized by the host, and thus can replace the space represented by a bad block in the memory device by allocating memory space in the over-provision region. Accordingly, if a bad block is identified in the memory device, the space within the memory device represented by the bad block can be restored by an over-provision region. As a result, the free space of host (HOST_FREE), that is, the remaining space of the memory device recognized by the host, can remain constant regardless of the existence of any bad blocks. If an actual capacity of the memory device reduced due to a bad block is greater than a capacity corresponding to the over-provision region, the memory system may enter a read only mode and prevent the occurrence of an additional bad block by blocking a program operation according to a request from the host.

In FIG. 2, first to fourth dirty sections DIRTY1 to DIRTY4 indicate respective time periods in which a controller is maintained in a dirty mode. IOPS in each section (time period) in which the controller is maintained in a dirty mode may be relatively smaller than IOPS in a section (time period) in which the controller is maintained in a normal mode. If a dirty section is short as is each of the first to fourth dirty sections DIRTY1 to DIRTY4, this may mean that a relatively large memory capacity is secured by a garbage collection operation performed in each instance on memory blocks each having a small number of valid pages. If the number of free blocks is less than or equal to a second threshold, the controller may enter a dirty mode corresponding to the first dirty section DIRTY'. If the number of free blocks reaches the second threshold as a result of securing more free blocks through frequently performed garbage collection operations in the first dirty section DIRTY1, the controller may decrease the frequency of execution of a garbage collection operation by entering a normal mode. If user data is programmed into a free block, thus reducing the number of free blocks to the second threshold or less again, the controller may enter a dirty mode corresponding to the second dirty section DIRTY2. If the length of the dirty section is short, as is each of the first to fourth dirty sections DIRTY1 to DIRTY4, performance of a host frequently varies due to the frequent change in garbage collection operation execution frequency.

Furthermore, if a dirty section is long like fifth and sixth dirty sections DIRTY5 and DIRTY6, this may correspond to a case where a small memory capacity is secured by a garbage collection operation performed on memory blocks including a large number of valid pages. In the first to sixth dirty sections DIRTY1 to DIRTY 6, the length of each of the first to fourth dirty sections DIRTY1 to DIRTY4 is short, whereas the length of each of the fifth and sixth dirty sections DIRTY5 and DIRTY6 is suddenly increased. Accordingly, a user cannot predict or expect uniformity in the length of each section in which performance of a host is degraded, because the length of each of the first to fourth dirty sections DIRTY1 to DIRTY4 is short and the length of each of the fifth and sixth dirty sections DIRTY5 and DIRTY6 is long.

According to an embodiment, the controller 130 may change frequency of the execution of a garbage collection operation based on the sum of the amount of restoration of garbage collection and the size of free blocks, without changing the frequency of execution of a garbage collection operation based on the number of free blocks. Specifically, after grouping according to valid page range ratios for each section, the controller 130 may detect memory blocks corresponding to each of the plurality of sections. A valid page ratio means the number of pages in a memory block versus the number of valid pages in the memory block. The controller 130 may sequentially detect memory blocks as a victim block candidate group from memory blocks, which correspond to a group in which a valid page ratio is the lowest. If a total count of invalid pages compared to the victim block candidate group is greater than a first threshold, the controller 130 may detect the victim block candidate group as victim blocks. The controller 130 may calculate the amount of restoration of garbage collection for the detected victim blocks.

The amount of restoration of garbage collection may be defined as the size of a space which may be restored if the controller 130 performs a garbage collection operation on the victim blocks in a dirty mode until user data is programmed into all of free blocks in the memory device 150. When the sum of the amount of restoration of garbage collection and the size of free blocks in the memory device 150 is less than the free space of host (HOST_FREE), the controller 130 may increase the frequency of execution of a garbage collection operation by entering a dirty mode.

According to an embodiment, a phenomenon in which a dirty section of short length frequently occurs can be prevented because the controller 130 determines whether to change the frequency of execution of a garbage collection operation based on the amount of restoration of garbage collection, not the number of free blocks. Furthermore, the controller 130 can maintain a relatively constant length of time of each dirty section by performing a garbage collection operation on victim blocks having similar ratios of valid pages. Accordingly, according to an embodiment, a user can expect regularity in the length and frequency of the section in which performance of the host is degraded and also secure a space in the memory device 150.

Figure 3:
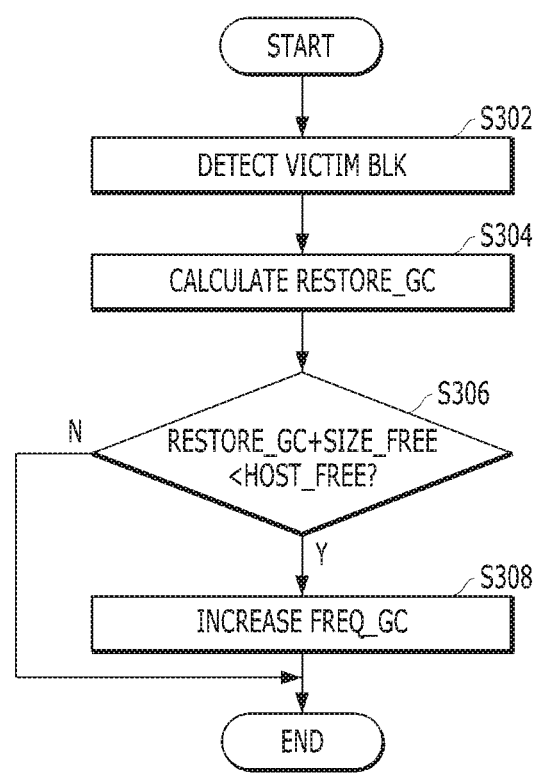
FIG. 3 is a flowchart illustrating an operating process of the data processing system according to an embodiment of the disclosure.

FIG. 3 is a flowchart illustrating an operating process of the data processing system 100 according to an embodiment of the disclosure.

FIG. 3 shows a case in which the controller 130 enters a dirty mode from a normal mode based on the amount of restoration of garbage collection.

At step S302, the controller 130 may detect a victim block (VICTIM BLK). The controller 130 may periodically detect one or more victim blocks (VICTIM BLK), As is described below with reference to FIG. 4, according to an embodiment, the controller 130 may detect, as the victim block(s) (VICTIM BLK), memory blocks having similar valid page ratios. After grouping the memory blocks according to their valid page ratios as shown in FIG. 5, the controller 130 may readily detect memory blocks having a particular valid page ratio range. The controller 130 may detect, as a victim block candidate group, memory blocks in a first group having the lowest valid page ratio range. When the sum of the numbers of invalid pages in all the victim block candidate groups is less than or equal to a third threshold TH3, the controller 130 may additionally select a second group which as a higher valid page ratio range than the first group.

The size of a group (in terms of its ratio) may be calculated as an average value of the valid page ratio range for that group. For example, the size of a first group having a ratio of valid pages of 0 to 10% may be 5. The size of a second group having a ratio of valid pages of 10 to 20% may be 15. Accordingly, the size of the first group may be smaller than that of the second group. More generally, the groups be aligned or presented in ascending order of size.

The controller 130 may further detect, as the victim block candidate group, memory blocks in the second group. For example, the controller 130 may detect, as the victim block candidate group, all the memory blocks in the first and second groups. The controller 130 may sequentially select groups until a total number of invalid pages in detected victim block candidate groups reaches (or exceeds) the third threshold TH3, and may detect, as the victim block candidate group, all memory blocks included in the selected group(s).

At step S304, the controller 130 may calculate the amount of restoration of garbage collection (RESTORE_GC) for the victim blocks detected at step S302. The amount of restoration of garbage collection (RESTORE_GC) may be the size of a space which may be restored as free space when the controller 130 performs a garbage collection operation on a victim block (VICTIM BLK) in a dirty mode. Specifically, the controller 130 may calculate the amount of restoration of garbage collection (RESTORE_GC) using Equation 1 below.

$$RESTORE\_GC = UNIT\_RESTORE \cdot EST\_CNT \qquad \text{[Equation 1]}$$

Specifically, the controller 130 may calculate the amount of restoration of garbage collection (RESTORE_GC) by multiplying the amount of restoration per unit garbage collection (UNIT_RESTORE) and an estimated garbage collection count (EST_CNT), which is the estimated number of times that a garbage collection operation is to be performed. The amount of restoration of unit garbage collection (UNIT_RESTORE) may be defined as the size of a space which may be restored by performing a single garbage collection operation on victim blocks. Furthermore, the estimated garbage collection count (EST_CNT) may be defined as the number of garbage collection operations performed until user data is programmed into all of free blocks, in the memory device 150, in a dirty mode. The controller 130 may calculate the amount of restoration of unit garbage collection (UNIT_RESTORE) using Equation 2 below.

$$UNIT\_RESTORE = \frac{IPC}{REQ\_CNT} \qquad \text{[Equation 2]}$$

The controller 130 may calculate the amount of restoration per unit garbage collection (UNIT_RESTORE) by dividing a total count of invalid pages (IPC), included in victim blocks, by a required garbage collection operation count (REQ_CNT). The required garbage collection operation count (REQ_CNT) may be defined as the number of garbage collection operations necessary to move all of valid data in the victim blocks. The controller 130 may calculate the required garbage collection operation count (REQ_CNT) using Equation 3 below.

$$REQ\_CNT = \frac{SIZE\_VALID}{THROUGHPUT\_GC} \qquad \text{[Equation 3]}$$

The controller 130 may calculate the required garbage collection operation count (REQ_CNT) by dividing the size of valid data (SIZE_VALID), included in the victim blocks, by a garbage collection throughput (THROUGHPUT_GC). The controller 130 may calculate the size of valid data (SIZE_VALID) in the victim blocks by calculating a difference between a total size of all victim blocks and a size of all invalid pages in the victim blocks. The garbage collection throughput (THROUGHPUT_GC) may be defined as the size of data which may be moved by a single garbage collection operation performed by the memory device 150. Furthermore, the controller 130 may calculate the estimated garbage collection count (EST_CNT) in a dirty mode using Equation 4.

$$EST\_CNT = \frac{SIZE\_FREE}{FREQ\_GC} \qquad \text{[Equation 4]}$$

As described above, the estimated garbage collection count (EST_CNT) may be defined as the number of garbage collection operations performed until user data is programmed into all of free blocks, included in the memory device 150, in a dirty mode. The controller 130 may calculate the estimated garbage collection count (EST_CNT) by dividing the size of free blocks (SIZE_FREE), included in the memory device 150, by the frequency of execution of a garbage collection operation (FREQ_GC) in a dirty mode. As described above, the frequency of execution of a garbage collection operation (FREQ_GC) may be determined as the number of garbage collection operations triggered and performed when the same amount of user data is programmed into the memory device 150. The frequency of the execution of a garbage collection operation (FREQ_GC) means frequency of execution of a garbage collection operation (FREQ_GC) in a dirty mode, and may have the same frequency as a result value obtained by increasing frequency of execution of a garbage collection operation (FREQ_GC) at step S308.

At step S306, the controller 130 may compare the sum of the amount of restoration of garbage collection (RESTORE_GC), which is calculated at step S304, and the size of all of free blocks (SIZE_FREE), included in the memory device 150, with the size of a free space of host (HOST_FREE). As described above, the size of a free space of host (HOST_FREE) may mean the remaining capacity of the memory device 150 recognized by the host 102. The controller 130 may calculate the size of a free space of host (HOST_FREE) by calculating a difference between an initial capacity of the memory device 150 right after the fabrication of the memory system 110 and the size of valid pages in the memory device 150. The initial capacity of the memory device 150 may be given in the specification for the memory device (or system). The initial capacity of the memory device 150 right after fabrication of the memory system 110 may be less than the actual capacity of the memory device 150 right after fabrication of the memory system 110 by an amount corresponding to an over provision region. For example, the controller 130 may periodically update the size of valid pages, in the memory device 150, whenever it performs map updates, and may calculate the size of a free space of host (HOST_FREE) by subtracting the updated size of valid pages, in the memory device 150, from an initial capacity of the memory device 150 right after fabrication of the memory system 110. If, as a result of the comparison, the sum of the amount of restoration of garbage collection (RESTORE_GC) and the size of all of free blocks (SIZE_FREE) in the memory device 150 is greater than or equal to the size of a free space of host (HOST_FREE) ("N" at step S306), the controller 130 may maintain the frequency of execution of garbage collection in a normal mode.

In FIG. 3, step S306 illustrates an embodiment of whether to enter a dirty mode, which is carried out by comparing the sum of the amount of restoration of garbage collection (RESTORE_GC) and the size of all of free blocks (SIZE_FREE), included in the memory device 150, with the size of the free space of host (HOST_FREE). In another embodiment, when the sum of the amount of restoration of garbage collection (RESTORE_GC) in a dirty mode and the size of all of free blocks (SIZE_FREE), included in the memory device 150, divided by the size of the free space of host (HOST_FREE) is less than a fourth threshold and the size of all of free blocks (SIZE_FREE) in the memory device 150 is less than a fifth threshold, the controller 130 may increase the frequency of execution of a garbage collection operation (FREQ_GC) by entering the dirty mode (from the normal mode).

If the sum of the amount of restoration of garbage collection (RESTORE_GC) and the size of all of free blocks (SIZE_FREE) in the memory device 150 is less than the size of a free space of host (HOST_FREE) ("Y" at step S306), then at step S308, the controller 130 may increase the frequency of execution of a garbage collection operation (FREQ_GC). The controller 130 may have been set to a normal mode initially. The execution frequency of a garbage collection operation in the normal mode may be less than the execution frequency of a garbage collection operation in the dirty mode. The controller 130 may increase the frequency of execution of a garbage collection operation (FREQ_GC) by entering the dirty mode (from the normal mode) based on the amount of restoration of garbage collection (RESTORE_GC), the size of free blocks (SIZE_FREE), and the free space of host (HOST_FREE), as indicated above. The controller 130 may control the memory device 150 to perform a garbage collection operation whenever user data having a size corresponding to the first threshold is programmed into the memory device 150. The controller 130 may increase the frequency of execution of a garbage collection operation by decreasing the size of the first threshold.

According to an embodiment, the controller 130 may enter a dirty mode when the sum of the expected size of a space which may be restored by a garbage collection operation performed using all free blocks during a dirty mode and the size of a space which may be actually provided through a current free block is less than a space of the memory device 150 recognized by the host 102. Accordingly, the controller 130 may maintain the state of increased garbage collection operation frequency until user data is programmed into all of free blocks now in the memory device 150. If the frequency of execution of a garbage collection operation (FREQ_GC) increases, performance of the host may be degraded. However, the degraded performance of the host 102 can be maintained at a constant level until the user data is programmed into all of the free blocks now included in the memory device 150 from when garbage collection is triggered until it is complete. Accordingly, while host performance is degraded, the user experiences, and thus comes to expect, the degradation at a constant level.

Although not illustrated, after entering the dirty mode at step S308, the controller 130 may later enter the normal mode again. For example, if the size of valid pages in the memory device 150 is decreased and the number of free blocks in the memory device 150 is increased in response to an erase command provided from the host 102 to the controller 130, the controller 130 may enter the normal mode and assign higher priority to performance of the host 102 than to a garbage collection operation. Specifically, after entering a dirty mode, the controller 130 may periodically calculate the amount of restoration of garbage collection (RESTORE_GC). The controller 130 may enter the normal mode when the sum of the amount of restoration of garbage collection (RESTORE_GC) in the dirty mode and the number of all of free blocks in the memory device 150 divided by the size of a free space of host (HOST_FREE) is greater than a sixth threshold. According to an embodiment, after entering a dirty mode, the controller 130 may enter the normal mode when the total number of free blocks in the memory device 150 is greater than a seventh threshold.

Figure 4:
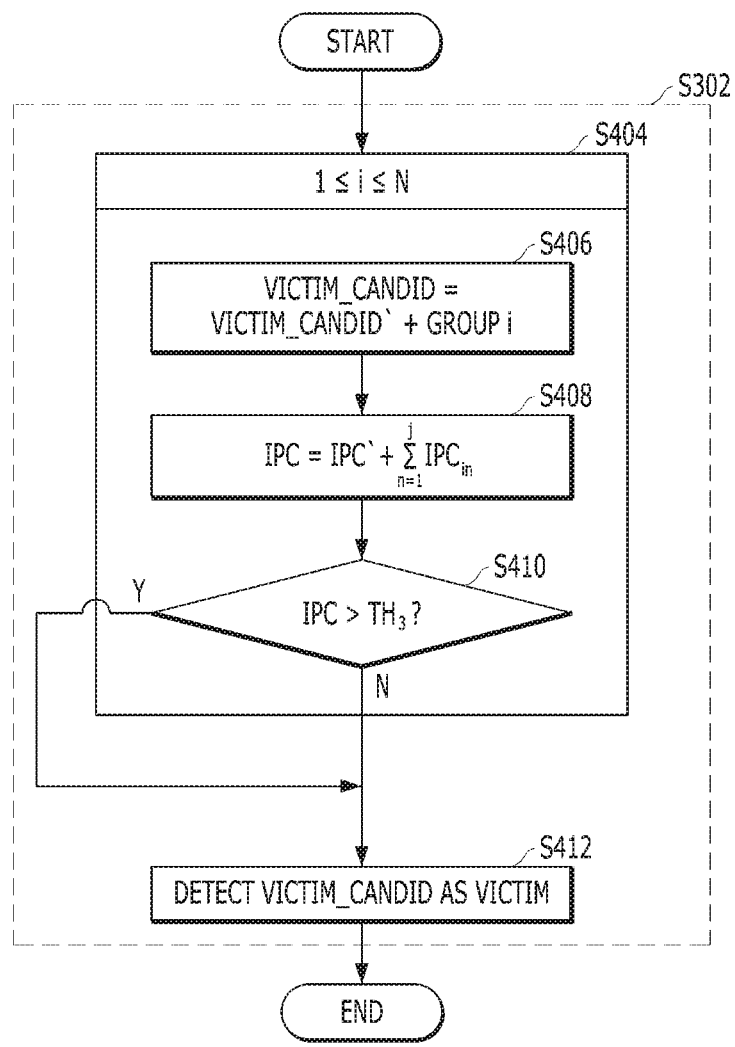
FIG. 4 is a flowchart illustrating in detail an example of an operating process of step S302 in FIG. 3.

FIG. 4 is a flowchart illustrating a detailed operating process of step S302 in FIG. 3.

The controller 130 may classify all memory blocks, which are included in the memory device 150, into a plurality of groups. In some embodiments, the controller 130 may classify the memory blocks into the groups based on a ratio of valid pages, as is described in FIG. 5. For example, the controller 130 may divide the ratios of valid pages for each section so that each section corresponds to each of the plurality of groups. The controller 130 may periodically update memory blocks in each group whenever it performs map updates.

The controller 130 may classify memory blocks as a corresponding one of the plurality of groups based on the ratio of valid pages of each of the memory blocks. The controller 130 may classify the memory blocks into N groups based on sections classified based on the ratio of valid pages. N groups may be arranged in ascending order of the sizes of the sections classified based on the ratio of valid pages. For example, the controller 130 may classify, as a first group, memory blocks corresponding to a first section having a ratio of valid pages of 0 to 10%, and may classify, as a second group, memory blocks corresponding to a second section having a ratio of valid pages of 10 to 20%.

At step S404, the controller 130 may repeatedly perform steps S406 to S410. The controller 130 may sequentially select classified groups until a total count of invalid pages (IPC) in all the memory blocks of selected groups is greater than a third threshold TH3. For example, the first group may be selected first, the third threshold TH3 may be the size of a space to be secured through a garbage collection operation, and may be the same as the size of a free space of host (HOST_FREE).

At step S406, the controller 130 may update a victim block candidate group (VICTIM_CANDID) by adding, to a detected victim block candidate group (VICTIM_CANDID'), memory blocks in an i-th group (GROUP i). An initial value of the victim block candidate group (VICTIM_CANDID) may be "0." For example, if j memory blocks are included in the i-th group, the controller 130 may update the victim block candidate group (VICTIM_CANDID) by adding first to j-th memory blocks to a previous victim block candidate group (VICTIM_CANDID').

At step S408, the controller 130 may calculate a count of invalid pages ($\Sigma_{n=1}^{j} IPC_{in}$), which are included in each of memory blocks in the victim block candidate group (VICTIM_CANDID) detected at step S406, Then, the controller 130 may update the total count of invalid pages (IPC) by adding the calculated count ($\Sigma_{n=1}^{j} IPC_{in}$) to a previous total count of invalid pages (IPC'). An initial value of the total count of invalid pages (IPC) may be "0." For example, if j memory blocks are included in an i-th group, the controller 130 may add a total count of invalid pages in all the j memory blocks, and may then update a total count of invalid pages (IPC) for the victim block candidate group (VICTIM_CANDID) by adding the addition to the previous total count of invalid pages (IPC') in all the memory blocks of the first to (i−1)-th groups.

At step S410, the controller 130 may compare the total count of invalid pages (IPC), which is updated at step S408, with the third threshold TH3. If the total count of invalid pages (IPC) is less than or equal to the third threshold TH3 ("N" at step S410), the controller 130 may repeatedly perform steps S406 to S410 until the total count of invalid pages (IPC) reaches the third threshold TH3. For example, when the total count of invalid pages in all the memory blocks of the first to i-th groups is less than or equal to the third threshold TH3, the controller 130 may repeatedly perform steps S406 to S410 on (i+1)-th to N-th groups until the total count of invalid pages (IPC) reaches the third threshold TH3.

If the total count of invalid pages (IPC) is greater than the third threshold TH3 ("Y" at step S410), at step S412, the controller 130 may detect the victim block candidate group (VICTIM_CANDID) as victim blocks (VICTIM). The controller 130 may calculate the amount of restoration of garbage collection (RESTORE_GC) on the detected victim blocks (VICTIM) at step S304, as described with reference to FIG. 3.

FIG. 5 illustrates memory blocks classified into a plurality of groups.

As described above, the controller 130 may classify each memory block in the memory device 150, into one of a plurality of groups. In the illustrated embodiment of FIG. 5, the controller 130 may each memory block BLK may be assigned to a particular one of the plurality of groups GROUP1 to GROUP10 based on a ratio of valid pages (RATIO_VP). The controller 130 may generate a VPC list 502 identifying each memory block in association with the group in which that block is classified. For example, the controller 130 may classify, in the first group GROUP1, memory blocks $BLK_{11}$ to $BLK_{1j1}$ each having a ratio of valid pages (RATIO_VP) of 0 to 10%. Furthermore, the controller 130 may sum the number of valid pages (ΣVPC) in the memory blocks of each of the plurality of groups GROUP1 to GROUP10, and may write that sum (ΣVPC) in the VPC list 502. The controller 130 may periodically update the VPC list 502. For example, the controller 130 may update the VPC list 502 whenever map updates are performed.

According to an embodiment, the controller 130 may align the groups in ascending order of their valid page ratio ranges. That is, the first group (GROUP1) may have the lowest valid page ratio range (0~40%) and the last group (GROUP10) may have the highest valid page ratio range (90~100%). The controller 130 may detect, as victim blocks, memory blocks in selected groups. The controller may calculate the amount of restoration of garbage collection (RESTORE_GC) based on a total number of invalid pages in all the victim blocks. The controller 130 can more rapidly detect victim blocks, in each of which the number of invalid pages (IPC) is greater than the third threshold TH3, based on the VPC list 502.

Figure 6:
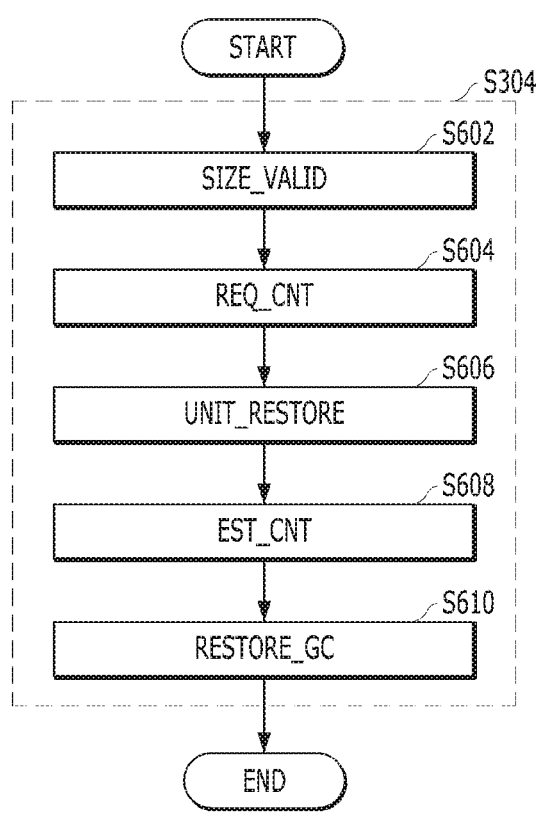
FIG. 6 is a flowchart illustrating in detail an example of an operating process of step S304 in FIG. 3.

FIG. 6 is a flowchart illustrating a detailed operating process of step S304 in FIG. 3.

Referring to FIG. 6, at step S602, the controller 130 may calculate the size of valid data (SIZE_VALID) in the victim blocks detected in step S302. The controller 130 can more rapidly calculate the size of valid data (SIZE_VALID), in the victim blocks, based on the VPC list 502 described with reference to FIG. 5.

At step S604, the controller 130 may calculate a required garbage collection operation count (REQ_CNT), i.e., the number of garbage collection operations to be performed, based on the size of valid data (SIZE_VALID) of the victim blocks calculated at step S602. As described above, the required garbage collection operation count (REQ_CNT) may be the number of garbage collection operations necessary to move all valid data in the victim blocks. In some embodiments, referring to Equation 3 above, the controller 130 may calculate the required garbage collection operation count (REQ_CNT) by dividing the size of valid data (SIZE_VALID), in the victim blocks, by a garbage collection throughput (THROUGHPUT_GC). As described above, the garbage collection throughput (THROUGHPUT_GC) may be the size of data moved by a single garbage collection operation performed by the memory device 150, and may be determined based on performance of the memory system 110.

At step S606, the controller 130 may calculate the amount of restoration per unit garbage collection (UNIT_RESTORE) based on the required garbage collection operation count (REQ_CNT) calculated at step S604. As described above, the amount of restoration per unit garbage collection (UNIT_RESTORE) may be the size of a space which may be restored by performing a single garbage collection operation on the victim blocks. In some embodiments, referring to Equation 2 above, the controller 130 may calculate the amount of restoration per unit garbage collection (UNIT_RESTORE) by dividing a total count of invalid pages (IPC), in the victim blocks, by the required garbage collection operation count (REQ_CNT) calculated at step S604. For example, the controller 130 may calculate a size, corresponding to the invalid page in the victim block, by calculating a difference between a total size of the victim blocks and the size of valid data (SIZE_VALID), in the victim blocks, based on the VPC list 502 described with reference to FIG. 5. Then, the controller 130 may calculate the total count of invalid pages (IPC) by dividing the size corresponding to the invalid pages by the size of a unit invalid page.

At step S608, the controller 130 may calculate an estimated garbage collection count (EST_CNT) using Equation 4. As described above, the estimated garbage collection count (EST_CNT) may be the number of garbage collection operations performed until user data is programmed into all of free blocks in the memory device 150. The controller 130 may calculate the estimated garbage collection count (EST_CNT) by dividing the size of free blocks (SIZE_FREE), in the memory device 150, by the frequency of execution of a garbage collection operation (FREQ_GC). As described above, the frequency of execution of a garbage collection operation (FREQ_GC) may be the number of garbage collection operations performed when the same amount of user data is programmed into the memory device 150. The frequency of execution of a garbage collection operation (FREQ_GC) may mean the frequency of execution of a garbage collection operation (FREQ_GC) in a dirty mode.

At step S610, the controller 130 may calculate the amount of restoration of garbage collection (RESTORE_GC) by multiplying the amount of restoration per unit garbage collection (UNIT_RESTORE) and the estimated garbage collection count (EST_CNT) calculated at steps S606 and S608, respectively. As described above, the amount of restoration per unit garbage collection (UNIT_RESTORE) may be the size of a space which may be restored by performing a single garbage collection operation on the victim blocks.

Figure 7:
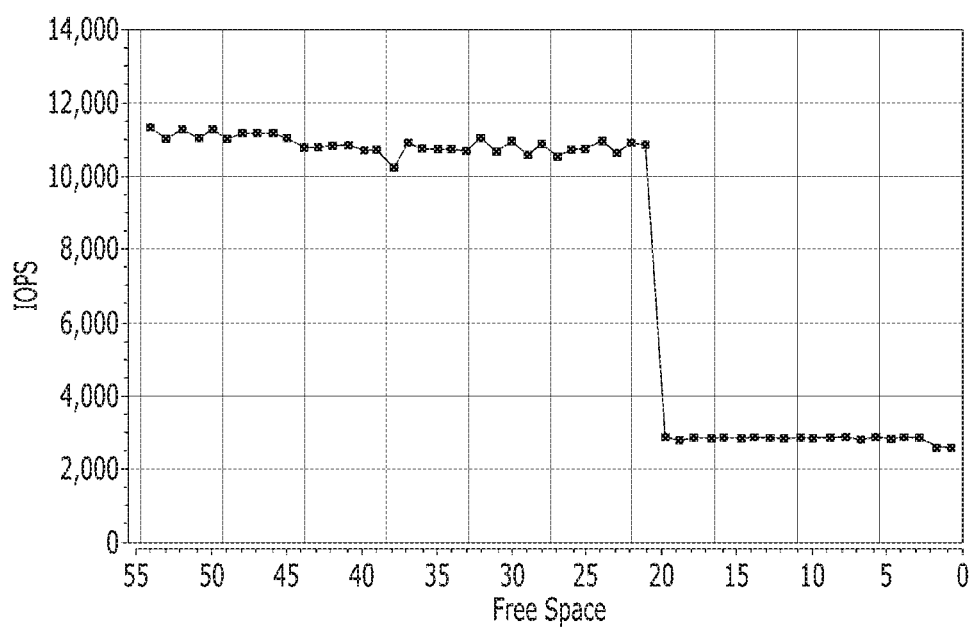
FIG. 7 is a graph illustrating simulation results of an operation of a controller according to an embodiment of the disclosure.

FIG. 7 is a graph illustrating simulation results of an operation of the controller 130 according to an embodiment of the disclosure.

The graph in FIG. 7 illustrates input/output operations per second (TOPS) based on a free space of a host. The free space of the host (Free Space) may be a capacity of the memory device 150, recognized by the host 102, as described above with reference to FIG. 2. Specifically, the free space of the host may be a difference between an initial capacity of the memory device 150 right after fabrication of the memory system 110 and the capacity of valid pages in the memory device 150. FIG. 7 shows a dirty section, that is, a time period in which performance (TOPS) of the host is suddenly degraded as the free space of the host (Free Space) is reduced. In the dirty section the controller 130 executes a garbage collection operation more frequently. From FIG. 7, it can be seen that after frequency of execution of a garbage collection operation (FREQ_GC) is increased in the dirty mode, performance (IOPS) of the host is maintained at a constant level until the free space of the host (Free Space) converges to "0."

The memory system according to embodiment of the disclosure may prevent frequent change in host performance because the controller frequently and alternately enters a normal mode and a dirty mode by entering a dirty mode based on the amount of restoration of garbage collection.

Although various embodiments have been illustrated and described, it will be apparent to those skilled in the art that various changes and modifications may be made without departing from the spirit and scope of the invention as defined in the following claims.

What is claimed is:

1. A memory system comprising:
a memory device comprising a plurality of memory blocks; and
a controller suitable for determining whether to change from a normal mode to a dirty mode based on a size of free space of a host and a sum of an amount of restoration of garbage collection for victim blocks and a size of all free blocks in the memory device,
wherein, in the dirty mode, the controller controls the memory device to perform a garbage collection operation on the victim blocks at a frequency greater than the frequency at which a garbage collection operation is performed in the normal mode,
wherein the amount of restoration of garbage collection is a size of a space restorable when the garbage collection operation is performed on the victim blocks until user data is programmed into all empty pages in the free blocks,
wherein the controller classifies the memory blocks into a plurality of groups corresponding to valid page ratio ranges,
wherein the controller determines a size of each group to be an average value of a number of entries in a valid page ratio range for a group,
wherein the controller selects victim block candidate groups by sequentially selecting each group from the plurality of groups until a total number of invalid pages in the detected victim block candidate groups is equal to or greater than a first-threshold, and
wherein the controller determines the victim block candidate groups to be all memory blocks included in the sequentially selected groups.

2. The memory system of claim 1, wherein the size of the free space of the host is a difference between an initial capacity of the memory device and a size of valid pages in the memory device.

3. The memory system of claim 1, wherein the controller arranges the groups in ascending order of size.

4. The memory system of claim 3, wherein the controller:
detects, as the victim blocks, memory blocks in a first group corresponding to a lowest valid page ratio range,
updates the victim blocks by adding, to the victim blocks, memory blocks, in a second group, when a total count of invalid pages for the victim blocks are less than or equal to the first threshold.

5. The memory system of claim 1, wherein:
the controller calculates the amount of restoration of garbage collection by multiplying an amount of restoration per unit garbage collection by an estimated garbage collection count,
the amount of restoration per unit garbage collection is a size of a space restorable by performing a single garbage collection operation on the victim blocks, and
the estimated garbage collection count is the number of garbage collection operations performed until user data is fully programmed into empty pages in all of the free blocks.

6. The memory system of claim 5, wherein:
the controller calculates the amount of restoration per unit garbage collection by dividing a size corresponding to the total number of invalid pages by a required garbage collection operation count, and
the required garbage collection operation count is the number of garbage collection operations necessary to move all valid data in the victim blocks.

7. The memory system of claim 6, wherein:
the controller calculates the required garbage collection operation count by dividing a size of the valid data in the victim blocks by a garbage collection throughput, and
the garbage collection throughput is a size of data movable by a single garbage collection operation performed by the memory device.

8. The memory system of claim 5, wherein the controller calculates the estimated garbage collection count by dividing a size of the free blocks by the frequency of execution of the garbage collection operation in the dirty mode.

9. The memory system of claim 1, wherein the controller:
controls the memory device to perform the garbage collection operation whenever user data having a size corresponding to a second threshold is programmed into the memory blocks, and
increases the frequency of execution of the garbage collection operation by decreasing the second threshold, when the controller enters the dirty mode.

10. An operating method of a memory system comprising:
determining whether to change from a normal mode to a dirty mode based on a size of free space of a host and a sum of an amount of restoration of garbage collection for victim blocks and a size of all free blocks in a memory device; and performing, in the dirty mode, a garbage collection operation on the victim blocks at a frequency greater than the frequency at which a garbage collection operation is performed in the normal mode, wherein the amount of restoration of garbage collection is a size of a space restorable when the garbage collection operation is performed on the victim blocks until user data is programmed into all empty pages in the free blocks, wherein the controller classifies the memory blocks into a plurality of groups corresponding to valid page ratio ranges, wherein the controller determines a size of each group to be an average value of a number of entries in a valid page ratio range for a group, wherein the controller selects victim block candidate groups by sequentially selecting each group from the plurality of groups until a total number of invalid pages in the detected victim block candidate groups is equal to or greater than a first-threshold, and wherein the controller determines the victim block candidate groups to be all memory blocks included in the sequentially selected groups.

11. The operating method of claim 10, wherein the size of the free space of the host is a difference between an initial capacity of the memory device and a size of valid pages in the memory device.

12. The operating method of claim 10, further comprising: arranging the groups in ascending order of size.

13. The operating method of claim 12, further comprising: detecting, as the victim blocks, memory blocks in a first group corresponding to a lowest valid page ratio range, updating the victim blocks by adding, to the victim blocks, memory blocks, in a second group, when a total count of invalid pages for the victim blocks are less than or equal to the first threshold.

14. The operating method of claim 10, further comprising calculating the amount of restoration of garbage collection by multiplying an amount of restoration per unit garbage collection by an estimated garbage collection count, wherein the amount of restoration per unit garbage collection is a size of a space restorable by performing a single garbage collection operation on the victim blocks, and wherein the estimated garbage collection count is the number of garbage collection operations performed until user data is fully programmed into empty pages included in all of the free blocks.

15. The operating method of claim 14, wherein:
the calculating of the amount of the restoration of garbage collection comprises calculating the amount of restoration per unit garbage collection by dividing a size corresponding to the number of invalid pages by a required garbage collection operation count, the required garbage collection operation count is the number of garbage collection operations necessary to move all valid data in the victim blocks, the calculating of the amount of restoration of garbage collection further comprises calculating the required garbage collection operation count by dividing a size of the valid data in the victim blocks by a garbage collection throughput, and the garbage collection throughput is a size of data movable by the single garbage collection operation performed by the memory device.

16. The operating method of claim 14, wherein the calculating of the amount of restoration of garbage collection comprises calculating the estimated garbage collection count by dividing a size of the free blocks by the frequency of execution of the garbage collection operation in the dirty mode.

17. The operating method of claim 10, further comprising:
performing the garbage collection operation whenever user data having a size corresponding to a second threshold is programmed into the memory blocks, and increasing the frequency of execution of the garbage collection operation by decreasing the second threshold, when the controller enters the dirty mode.

18. A memory system comprising:
a memory device including a plurality of memory blocks; and a controller, coupled to the memory device, suitable for:
performing a normal garbage collection operation in a normal mode at a first rate;

determining whether to change from the normal mode to a dirty mode based on the number of valid pages, the number of free blocks and a restoration amount associated with the normal garbage collection operation; and performing, in the dirty mode, a dirty garbage collection operation at a second rate greater than the first rate, wherein the restoration amount associated with the normal garbage collection is a size of a space restorable when the normal garbage collection operation is performed on victim blocks until user data is programmed into all empty pages in the free blocks, wherein the controller classifies the memory blocks into a plurality of groups corresponding to valid page ratio ranges, wherein the controller determines a size of each group to be an average value of a number of entries in a valid page ratio range for a group, wherein the controller selects victim block candidate groups by sequentially selecting each group from the plurality of groups until a total number of invalid pages in the detected victim block candidate groups is equal to or greater than a first-threshold, and wherein the controller determines the victim block candidate groups to be all memory blocks included in the sequentially selected groups.

* * * * *